No. 673,348.                         Patented Apr. 30, 1901.

J. L. WOODBRIDGE.
ELECTRICAL DISTRIBUTION.
(Application filed Mar. 13, 1901.)

(No Model.)

UNITED STATES PATENT OFFICE.

JOSEPH LESTER WOODBRIDGE, OF PHILADELPHIA, PENNSYLVANIA, ASSIGNOR TO THE ELECTRIC STORAGE BATTERY COMPANY, OF SAME PLACE.

ELECTRICAL DISTRIBUTION.

SPECIFICATION forming part of Letters Patent No. 673,348, dated April 30, 1901.

Application filed March 13, 1901. Serial No. 50,989. (No model.)

*To all whom it may concern:*

Be it known that I, JOSEPH LESTER WOODBRIDGE, a citizen of the United States, residing at the city of Philadelphia, in the county of Philadelphia and State of Pennsylvania, have invented certain new and useful Improvements in Electrical Distribution, of which the following is a specification.

This invention relates to those systems of electrical distribution in which a storage battery, with its complemental booster, is operated in conjunction with one or more compound-wound generators to supply a variable demand; and the principal objects of this invention are, first, without using large or expensive field-coils and without involving instability in operation, to cause the battery to compensate for and relieve the generating machinery from the variations from the average load, which latter is carried by said compound-wound generators; second, to provide for causing the voltage of such a generating plant to rise or fall with a rise or fall, respectively, of its output, notwithstanding the fact that the generating machinery carries only a constant load; third, to provide means for adjusting the operation of the booster for changes which may occur from time to time in the condition and operation of the battery or in the number of generators in use.

To these and other ends hereinafter set forth the invention, stated in general terms, comprises a connection which includes the proper resistance and one or more cells of battery and which is connected with the brush of the booster in such a way that it coöperates with the series field of the generator, as will be hereinafter described.

The nature, characteristic features, and scope of the invention will be more fully understood from the following description, taken in connection with the accompanying drawings, forming part hereof, and in which—

Figure 1 is a diagrammatic view illustrating circuits which embody the invention, and Fig. 2 is a similar view illustrating a modification of the invention.

In the drawings, $a$ is an electric storage battery, and $b$ is its series-wound booster. The storage battery and its booster $a$ and $b$ are arranged across the leads 1 and 2, and these leads feed the working circuit 3 4. The purpose of the storage battery is to take current from the leads 1 2 at times of less than the average load on the circuit 3 4 and to supply current to the leads 1 2 at times when the load on the circuit 3 4 is greater than the average load. The average load is taken by the generators.

In Fig. 1 two compound-wound generators $c$ and $d$ are shown. $e$ is the equalizing bus-bar. $f$ and $f'$ are the shunt-fields, and $f^2$ and $f^3$ are the series fields.

In Fig. 2 there is but one generator $d'$, and its series field is indicated at $f^4$ and its other field at $f^5$. The described generators are or may be overcompounded, which, as is well-known, is advantageous because it compensates for drop of voltage on the line. From the brush of the booster $b$ there is connected a connection 5, which includes one or more cells of storage battery $g$, and also an appropriate resistance, which may comprise an adjustable resistance $h$. As shown in Fig. 1 this equalizing connection 5 leads to the equalizing bus-bar $e$, and as shown in Fig. 2 it leads to the brush of the single generator. Under conditions of average load on the working circuit the equalizing connection 5 is adjusted by means of the cells of storage battery in such a way that no current traverses it. This is the object of these cells. In other words, they present a counter electromotive force exactly equal to the difference in voltage between the ends of the series field-coils of the generator or generators.

In use when the average load is on the circuit 3 4 no current is given to or from the battery $a$ and all of the work is done by the generator or generators. Under these conditions current is not flowing through the connection 5 nor through the field of the booster. If the load upon the circuit 3 4 exceeds the average load, this increase of current will pass partly through the series coil of the booster and partly through the series coils of the generators, this division depending upon the relative resistances of the several paths in accordance with well-known laws. If the series coil of the booster is so designed that the proportion of current flowing through it under these circumstances shall produce in the booster sufficient voltage to compensate for the drop in the battery voltage due to a discharge equal to the entire assumed increase of load and to compensate also for the increase in the generator voltage due to that portion of the increase in current which flows through the generator series coils, then will the entire variation of load fall on the battery, and the load on the generators will remain constant notwithstanding the fact that the current in their series coils varies, for this is the only result that will produce voltage at the terminals of the generators equal to that at the terminals of the battery and booster. As noted above, when the various circuits are properly adjusted to throw all of the variations of load on the battery a portion of such variations will pass through the series coils of the booster, while the balance will flow through the equalizing-circuit 5 and the series coils of the generators. It is obvious that by increasing the resistance of this equalizing-circuit by means of the adjustable rheostat $h$ a greater portion of any increase in load may be made to pass through the booster series coil and less through the generator series coils, thus increasing the effect on the booster voltage and decreasing that on the generator voltage. In this way any increase in the internal resistance of the battery, causing an increased drop in voltage under discharge, may be compensated for. In like manner, when an additional generator is brought into use its series coil is connected in parallel with the others, reducing the resultant resistance and diverting a portion of the current from the booster series coil. By increasing the resistance of the equalizing-circuit by means of the rheostat $h$ adjustment may be restored. As already noted, one of the objects of operating a storage battery in conjunction with generators is to permit the latter to carry a constant load. With the equalizing connection 5 omitted and a constant load on the generators the voltage at the generator-terminals will necessarily be constant. The battery and booster would therefore have to be adjusted to maintain a constant voltage regardless of load; but if the generator is evenly compounded it will also maintain constant voltage regardless of load. Any assumed division of load between the battery and the generators will therefore produce equilibrium, and there is nothing to insure that the fluctuations of load shall fall wholly on the battery. Moreover, under these conditions, with the equalizing connection 5 omitted, any slight disturbance of equilibrium—for example, an increase in the generator voltage due to increased speed—will cause a current to flow between the generators and battery, and with evenly-compounded generators and battery this current will have no tendency to restore equilibrium, and with overcompounded generators it will aggravate the disturbance, and this extra current will continue to increase until some safety device opens the circuit or some damage is done. In other words, without the connection 5 a state of unstable equilibrium exists. If, however, this connection is restored and the same disturbance occurs, a portion of the extra current will flow through 5 and only a portion through the series coils of generators and boosters, which will not be sufficient to prevent the restoration of equilibrium by the effect of this extra current on the voltage of the generators and battery.

It will be obvious to those skilled in the art to which the invention relates that modifications may be made in details without departing from the spirit thereof. Hence I do not limit myself to the precise construction and arrangement of parts hereinabove set forth, and illustrated in the accompanying drawings; but,

Having thus described the nature and objects of the invention, what I claim as new, and desire to secure by Letters Patent, is—

1. In a system of electrical distribution the combination with a battery and its complemental booster and a compound-wound generator arranged in parallel relation thereto, of a circuit connecting the corresponding brushes and inner terminals of the series fields of the booster and generator, substantially as described.

2. In a system of electrical distribution the combination with a battery and its complemental booster and a compound-wound generator arranged in parallel relation thereto, of a circuit containing a cell or cells of battery and connecting the corresponding brushes and inner terminals of the series fields of the booster and generator, substantially as described.

3. In a system of electrical distribution the combination with a battery and its complemental booster and a compound-wound generator arranged in parallel relation thereto, of a circuit containing a cell or cells of battery and an adjustable resistance and connecting the corresponding brushes and inner terminals of the series fields of the booster and generator, substantially as described.

In testimony whereof I have hereunto signed my name.

JOSEPH LESTER WOODBRIDGE.

Witnesses:
AUGUSTUS B. STOUGHTON,
JOHN R. WILLIAMS.